US008359272B2

(12) United States Patent
Lutnick et al.

(10) Patent No.: US 8,359,272 B2
(45) Date of Patent: *Jan. 22, 2013

(54) METHODS AND APPARATUS FOR ELECTRONIC FILE USE AND MANAGEMENT

(75) Inventors: Howard Lutnick, New York, NY (US); Dean P. Alderucci, Westport, CT (US)

(73) Assignee: CFPH, LLC, New York, NY (US)

( * ) Notice: Subject to any disclaimer, the term of this patent is extended or adjusted under 35 U.S.C. 154(b) by 270 days.

This patent is subject to a terminal disclaimer.

(21) Appl. No.: 12/541,542

(22) Filed: Aug. 14, 2009

(65) Prior Publication Data

US 2009/0307062 A1    Dec. 10, 2009

Related U.S. Application Data

(62) Division of application No. 11/747,607, filed on May 11, 2007, now Pat. No. 7,647,276.

(60) Provisional application No. 60/747,092, filed on May 11, 2006.

(51) Int. Cl.
*G06F 21/00* (2006.01)

(52) U.S. Cl. ............. 705/57; 705/901; 705/59; 705/51; 705/904

(58) Field of Classification Search ............. 705/51–80, 705/901–912; 713/155–159, 182–186; 380/250
See application file for complete search history.

(56) References Cited

U.S. PATENT DOCUMENTS

| | | | |
|---|---|---|---|
| 5,586,264 A | 12/1996 | Belknap et al. | |
| 6,385,596 B1 | 5/2002 | Wiser et al. | |
| 6,615,318 B2 | 9/2003 | Jarvis et al. | |
| 6,769,028 B1 | 7/2004 | Sass et al. | |
| 7,139,263 B2 | 11/2006 | Miller et al. | |
| 7,194,752 B1 | 3/2007 | Kenyon et al. | |
| 7,519,667 B1 * | 4/2009 | Capps | 709/206 |
| 7,555,288 B2 * | 6/2009 | Bowen | 455/412.2 |
| 7,647,276 B2 | 1/2010 | Lutnick et al. | |
| 7,664,751 B2 | 2/2010 | O'Sullivan et al. | |
| 2001/0037506 A1 | 11/2001 | Garfinkle | |
| 2001/0042043 A1 | 11/2001 | Shear et al. | |

(Continued)

FOREIGN PATENT DOCUMENTS

EP    04292126.2    *    9/2004

(Continued)

OTHER PUBLICATIONS

Ulrich H. Reimers, "DVB—The Family of International Standards for Digital Video Broadcasting", Proceedings of the IEEE, vol. 94, No. 1, Jan. 2006, all pages, http://www.tijbc.com/pruebas-7419/I0782912.pdf.*

EPO Machine Translation of PCT Publication No. WO 03/017270 A1 in the name of Thomas Klotz et al., Published Feb. 27, 2003, Translated Sep. 30, 2009, 6 pp.

JPO Machine Translation of Japanese Publication No. 2002-245263, Applicant Name: Extasy, Published Aug. 30, 2002, Translated Sep. 30, 2009, 13 pp.

(Continued)

*Primary Examiner* — James Kramer
*Assistant Examiner* — Calvin Cheung

(57) ABSTRACT

Methods and apparatus are disclosed for facilitating online storage of files (e.g., audio tracks, video, etc.) for playback/access or sale/exchange by the owners of the files without violating copyrights that copyright holders have in the files. For example, by providing a playback service that does not store additional versions of an audio file when the file is transmitted to, and immediately played on, a user device without buffering, the present invention avoids violating copyright laws by not making copies of the file. Numerous other aspects are disclosed.

27 Claims, 3 Drawing Sheets

U.S. PATENT DOCUMENTS

| | | | |
|---|---|---|---|
| 2001/0044851 A1 | 11/2001 | Rothman et al. | |
| 2002/0002039 A1* | 1/2002 | Qureshey et al. | 455/344 |
| 2002/0107968 A1 | 8/2002 | Horn et al. | |
| 2002/0157002 A1 | 10/2002 | Messerges et al. | |
| 2002/0188746 A1 | 12/2002 | Drosset et al. | |
| 2003/0004880 A1 | 1/2003 | Banerjee et al. | |
| 2003/0061490 A1 | 3/2003 | Abajian | |
| 2003/0073432 A1 | 4/2003 | Meade | |
| 2003/0076815 A1 | 4/2003 | Miller et al. | |
| 2003/0206558 A1 | 11/2003 | Parkkinen et al. | |
| 2003/0236906 A1 | 12/2003 | Klemets et al. | |
| 2004/0003090 A1 | 1/2004 | Deeds | |
| 2004/0004599 A1 | 1/2004 | Shepard et al. | |
| 2004/0030741 A1 | 2/2004 | Wolton et al. | |
| 2004/0068606 A1 | 4/2004 | Kim et al. | |
| 2004/0083273 A1 | 4/2004 | Madison et al. | |
| 2004/0103189 A1 | 5/2004 | Cherkasova et al. | |
| 2004/0210604 A1 | 10/2004 | Li et al. | |
| 2005/0021780 A1 | 1/2005 | Beyda | |
| 2005/0177387 A1 | 8/2005 | Mojsa | |
| 2005/0190199 A1 | 9/2005 | Brown et al. | |
| 2005/0195978 A1 | 9/2005 | Babic et al. | |
| 2005/0198510 A1 | 9/2005 | Robert et al. | |
| 2005/0198677 A1 | 9/2005 | Lewis | |
| 2005/0201461 A1 | 9/2005 | Suzuki et al. | |
| 2005/0246451 A1 | 11/2005 | Silverman et al. | |
| 2005/0276264 A1 | 12/2005 | Cordero et al. | |
| 2006/0015580 A1 | 1/2006 | Gabriel et al. | |
| 2006/0095515 A1* | 5/2006 | Forstadius | 709/205 |
| 2006/0101487 A1 | 5/2006 | Jarman et al. | |
| 2006/0128425 A1 | 6/2006 | Van Rooyen | |
| 2006/0218241 A1* | 9/2006 | Fok et al. | 709/217 |
| 2006/0242069 A1 | 10/2006 | Peterka et al. | |
| 2006/0288112 A1 | 12/2006 | Soelberg et al. | |
| 2007/0061317 A1 | 3/2007 | Ramer et al. | |
| 2007/0072606 A1* | 3/2007 | van Rooyen | 455/434 |
| 2007/0147409 A1 | 6/2007 | Kallio et al. | |
| 2007/0203916 A1 | 8/2007 | Kwak | |
| 2008/0046372 A1 | 2/2008 | Lutnick et al. | |
| 2009/0063350 A1* | 3/2009 | Briggs et al. | 705/59 |
| 2009/0307289 A1 | 12/2009 | Lutnick et al. | |
| 2010/0205064 A1 | 8/2010 | Lutnick et al. | |
| 2010/0211438 A1 | 8/2010 | Lutnick et al. | |

FOREIGN PATENT DOCUMENTS

| | | | |
|---|---|---|---|
| EP | 1768285 A1 * | 3/2007 | |
| JP | 2002-245263 | 8/2002 | |
| JP | 2004-328603 | 11/2004 | |
| JP | 2005-322995 | 11/2005 | |
| WO | WO 03/017270 A1 | 2/2003 | |
| WO | WO 03/017271 A1 | 2/2003 | |
| WO | WO2004/086724 | 10/2004 | |

OTHER PUBLICATIONS

Onieva, Jose A. et al., "Integration of non-repudiation services in mobile DRM scenarios", Springer Science+Business Media, LLC, published online: Sep. 22, 2007, 17 pp.

Rodriguez, Eva and Delgado, Jaime, "Verification algorithms for governed use of multimedia content", Online Information Review, vol. 31, No. 1, 2007, pp. 38-58.

"Music Brokerage Grooveshark Goes Live with Limited Private Alpha Release; Starting Today Grooveshark Members Can Share DRM-Free Files Legally and Earn Free Music Through PR Newswire", PR Newswire, Mar. 25, 2007, 2 pp.

USPTO Office Action for U.S. Appl. No. 12/541,593, Feb. 2, 2011 (11 pages).

Japanese Office Action with English translation for Application No. 2009-509881, mailed May 10, 2011 (7 pages).

U.S. Appl. No. 11/747,607, filed May 11, 2007, Lutnick et al.

U.S. Appl. No. 12/541,593, filed Aug. 14, 2009, Lutnick et al.

U.S. Appl. No. 12/631,652, filed Dec. 4, 2009, Lutnick et al.

USPTO Notice of Allowance and Fees Due for U.S. Appl. No. 11/747,607, Oct. 19, 2009 (15 pages).

Piesing, J., The DVB Multimedia Home Platform (MHP) and Related Specifications, Proceedings of the IEEE, vol. 94, Issue 1, Jan. 2006, pp. 237-247.

USPTO Office Action for Application No. 12/541,593, Jun. 24, 2010 (8 pages).

USPTO Examiner Interview Summary Record for U.S. Appl. No. 11/747,607, Aug. 14, 2009 (2 pages).

USPTO Response to Amendment under Rule 312 for Application No. 11/747,607, Dec. 10, 2009 (2 pages).

U.S. Appl. No. 60/747,092, filed on May 11, 2006, Inventor: Dean P. Alderucci, entitled "Methods and Apparatus for Electronic File Use and Management" (20 pages).

U.S. Appl. No. 12/631,651, filed on Dec. 4, 2009, Inventor: Howard Lutnick, et al., entitled "Methods and Apparatus for Playback of an Electronic File" (39 pages).

Australian Exam Report for Application No. 2007249777, dated Feb. 9, 2010 (2 pages).

EPO Machine Translation of PCT Publication No. WO 03/017271 A1 in the name of Thomas Klotz et al., Published Feb. 27, 2003, Translated Sep. 30, 2009, 6 pp.

Digital Dictionary, May 18, 2003, p. 9 [Retrieved on Mar. 5, 2009 via The Wayback Machine].

Office Action for U.S. Appl. No. 11/747,607, Mar. 16, 2009, 24 pp.

Preliminary Examination Report for International Application No. PCT/US2007/11439, issued Nov. 11, 2008, 9 pp.

International Search Report for International Application No. PCT/US2007/11439, mailed Feb. 27, 2008, 3 pp.

Written Opinion for International Application No. PCT/US2007/11439, mailed Feb. 27, 2008, 8 pp.

Requirement for Restriction/Election for U.S. Appl. No. 11/747,607, Dec. 24, 2008, 10 pp.

U.S. Appl. No. 11/747,607, filed May 11, 2007 in the name of Lutnick et al.

U.S. Appl. No. 12/541,593, filed Aug. 14, 2009 in the name of Lutnick et al.

USPTO Examiner Initiated Interview Summary for U.S. Appl. No. 12/541,593, May 11, 2012 (2 pages).

Australian Exam Report for Application No. 2011247829, dated Jul. 4, 2012 (4 pages).

USPTO Notice of Allowance and Fees Due for U.S. Appl. No. 12/631,652, Jun. 29, 2012 (10 pages).

USPTO Notice of Allowance and Fees Due for U.S. Appl. No. 12/541,593, May 30, 2012 (13 pages).

"How to check which user delete a file that is place on network drive." IT Knowledge Exchange, all pages, Dec. 14, 2007. http://web.archive.org/web/20071221212928/http://itknowledgeexchange.techtarget.com/itanswers/ho w-to-check-which-user-delete-a-file-that-is-place-on-network-drive/.

How to audit File / Directory delete Operations on a Window System using security auditing. MonitorWare, all pages, Dec. 12, 2007. http://web.archive.org/web/20080415154917/http://www.monitorware.com/Common/en/Articles/audit_file_deletion.php.

USPTO Office Action for U.S. Appl. No. 12/541,593, Oct. 11, 2011 (22 pages).

Kornfeld et al., DVB-H—The Emerging Standard for Mobile Data Communication, EBU Technical Review, Jan. 2005, http://tech.ebu.ch/docs/techreview/trev_301-dvb-h.pdf.

Gralla, P., How the Internet Works, Sep. 2003, Que Publishing, 7th Edition, all pages.

Socolofsky et al., RFC 1180: A TCP/IP Tutorial, Network Working Group, Jan. 1991, all pages. http://tools.ietf.org/pdflrfc1180.pdf.

RTSP Interoperability With Realsystem Server 8, RealNetworks, Dec. 7, 2000, all pages; http://docs.real.com/docs/rtsp.pdf.

USPTO Office Action for U.S. Appl. No. 12/631,652, Oct. 28, 2011 (15 pages).

USPTO Office Action for U.S. Appl. No. 12/631,651, Dec. 2, 2011 (17 pages).

Japanese Notice of Allowance with English translation for Application No. 2009-509881, mailed Nov. 22, 2011 (4 pages).

U.S. Appl. No. 60/792,107, filed Apr. 15, 2006, McGucken.

* cited by examiner

METHODS AND APPARATUS FOR ELECTRONIC FILE USE AND MANAGEMENT

The present application is a divisional of U.S. patent application Ser. No. 11/747,607, filed May 11, 2007 now U.S. Pat. No. 7,647,276, which claims priority from U.S. Provisional Application Ser. No. 60/747,092, filed May 11, 2006, each of which is hereby incorporated by reference herein in its entirety.

BACKGROUND OF THE INVENTION

Existing file use and management systems, including existing file exchange systems, typically make copies of the files. Such practice may violate copyright laws. What is needed are file use and management systems and methods that avoid making copies of the files.

SUMMARY OF THE INVENTION

In certain aspects of the invention, a method is provided including storing a first copy of an audio file, the first copy of the audio file being owned by a first party who does not have custody of the first copy of the audio file; receiving a request for playback of the audio file; verifying the request is from the first party; and transmitting a signal representative of the first copy of the audio file to one or more playback devices associated with the first party, the playback devices being operative to receive the signal and play the audio file without storing any portion of the audio file for longer than a minimal time that the playback devices may require to play the portion upon receiving the portion of the audio file.

In other aspects of the invention, a method is provided including storing a first copy of a file associated with a first party having an ownership right in the first copy of the file, the file being a copyrightable expression; and providing playback of the first copy of the file on a device associated with the first party without making a second copy of the file.

In yet other aspects of the invention, a method is provided including storing a copy of each of a plurality of files, each copy associated with a first party having an ownership right in each stored copy of the files; and providing remote playback of any copy of the files to the first party without violating copyrights of copyright owners of the files.

In still yet other aspects of the invention, a method is provided including storing a number of copies of a file, each copy associated with a different party, each party having an ownership right in at least one of the stored copies of the file; and providing concurrent remote playback of the copies of the files to the parties without violating copyrights of copyright owners of the files.

In further aspects of the invention, a method is provided including storing a number of copies of a file, the copies associated with an organization, the organization having an ownership right in the copies; admitting a plurality of parties as members of the organization; and providing concurrent remote playback of the copies of the files to the members without violating copyrights of copyright owners of the files.

In yet further aspects of the invention, a method is provided including storing a copy of a file associated with a first party having an ownership right in the copy of the file, the ownership right being subject to a restriction; and providing remote playback of the copy of the file to the first party without violating a copyright of a copyright owner of the file and without violating the restriction.

In still yet further aspects of the invention, a device for playback of a file is provided including an interface module adapted to request playback of a first copy of a file associated with a first party having an ownership right in the first copy of the file, the file being a copyrightable expression; and a file playback module coupled to the interface module and adapted to receive and concurrently playback, without storing, the first copy of the file.

Other features and aspects of the present invention will become more fully apparent from the following detailed description, the appended claims, and the accompanying drawings.

DETAILED DESCRIPTION

The present invention may be used to facilitate online storage of files (e.g., audio tracks, video, etc.) for playback/access or sale/exchange by the owners of the files without violating copyrights that copyright holders have in the files. For example, by providing a playback service that does not store additional versions of an audio file when the file is transmitted to, and immediately played on, a user device without buffering, the present invention avoids violating copyright laws by not making copies of the file.

Figure 1:
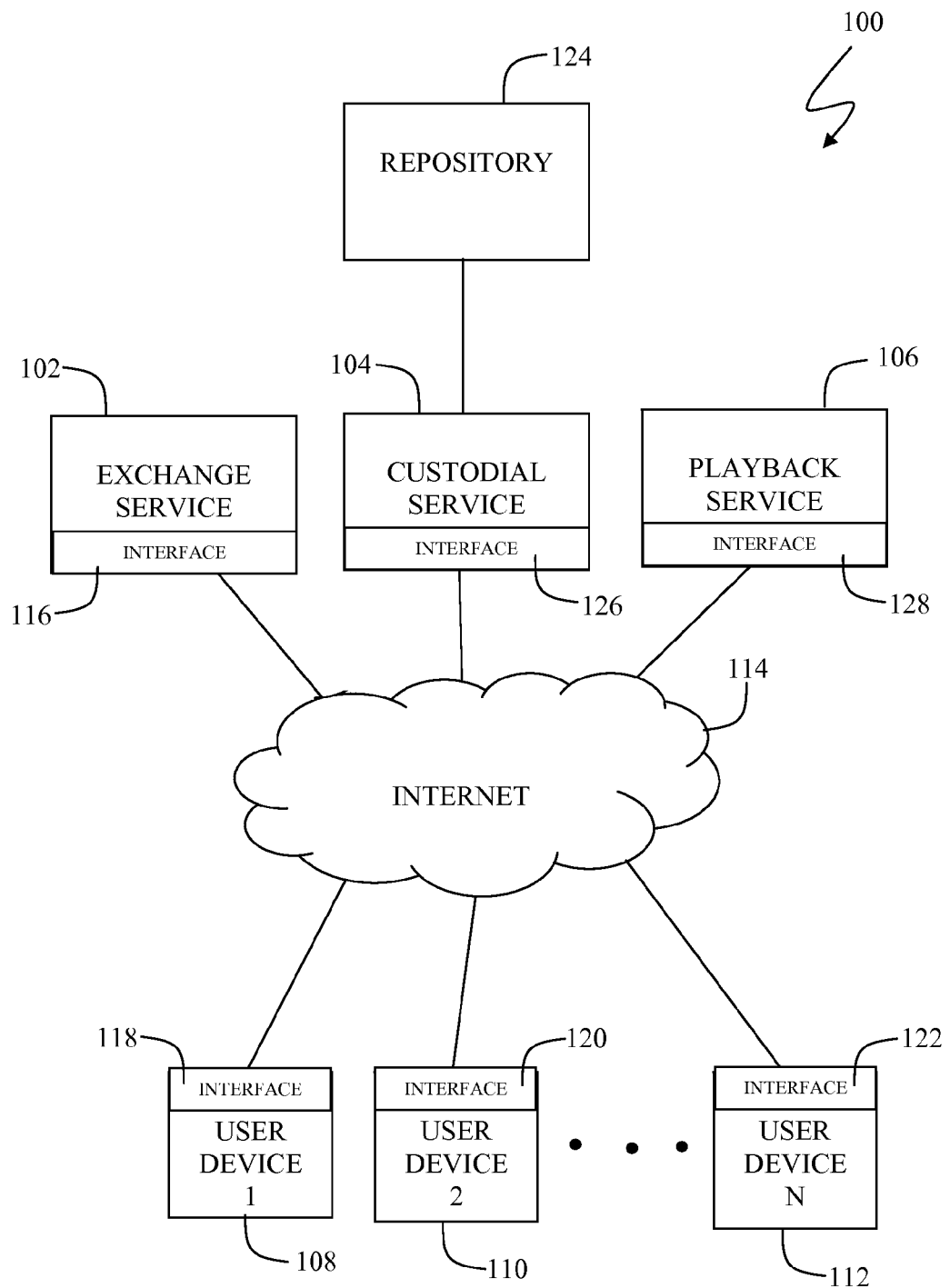
FIG. 1 is a block diagram depicting an example embodiment of a system according to some embodiments of the present invention.

Referring to FIG. 1, embodiments of the present invention may include a system 100 that provides an exchange service 102, a custodial service 104, and a playback service 106 for exchanging, storing, and/or playing/accessing files, respectively, in the system 100. As indicated above, the system 100 of the present invention may be adapted to work with any number of different file types including, for example, music tracks, application service provider (ASP) data, objects, and/or application files, software applications, data or graphics compilations (e.g., LEXIS® database information, various directories, maps, etc.), movies, television shows, video games, animations, computer presentations, websites, news feeds, etc. As used herein and unless otherwise specified, the term playback may refer to playing or accessing a file or a portion thereof.

An exchange service 102 or function according to the present invention may be embodied as a computer server or host executing one or more software applications and/or operating systems (OS). In some embodiments an operator may control aspects of the server's operation and in other embodiments the server may be fully automated. The exchange service 102 may be coupled to and communicate with other devices, servers or services (e.g., a custodial service 104, a playback service 106, user devices 108, 110, 112, a file distribution server, etc.) either directly, for example, via a secure network or indirectly, for example, via intermediary servers or the Internet 114. Users may access the exchange service 102 or receive transmissions from the exchange service 102 via any number of various different user devices 108, 110, 112 including, for example, cellular phones, networked computers, wireless personal digital assistants (PDAs), hand held devices, satellite radio receivers, media players (e.g., Apple®, Inc. iPod®, SanDisk® Sansa®, Toshiba® Gigabeat®, etc.) that may be modified to access a network, WiFi devices including, for example, laptop computers, the Nokia® 770 Internet Tablet®, etc. In some embodiments, the exchange service 102 may include an interface 116 (e.g., user and/or operator interface) embodied as a web page (e.g., an HTML or XML based world wide web (WWW) page) while in others, the user devices may include interfaces 118, 120, 122.

The exchange service 102 may include facilities for effecting monetary, barter, or other transactions. For example, the exchange service 102 may include security features and protocols adapted to permit connections to banks, credit card companies, other secure financial institutions, and/or the automated clearing house (ACH) network operated by the Federal Reserve. The exchange service 102 may also be adapted to purchase and transfer files from other parties that sell any of the various types of files. The exchange service 102 may, for example, store such files with the custodial service 104 discussed in detail below.

The exchange service 102 may include auditing capabilities that provide accounting information and file verification functions. For example, the exchange service 102 may include means to uniquely identify each instance of a copy of a file (e.g., by assigning or associating a serial number and/or using an electronic "wartermark" incorporated into the content of the file) so that at any given moment, all files within the domain of the exchange service 102 can be verified as "legal," non-pirated, copyright compliant copies of the files. Further, the exchange service 102 may store historical information regarding who has purchased and sold a particular instance of a file so that a chain of title may be determined. The exchange service 102 may include programs to compile and/or aggregate the chain of title information with other transaction information such as, for example, sales price and time on market to determine marketing information. In some embodiments, the exchange service 102 may use such information to set prices for files.

In operation the exchange service 102 may function as a convenient means to resell or acquire previously owned and new copies of files. In other words, the exchange service 102 may function as a market place for buying and selling "legal," non-pirated, copyright compliant copies of files. The exchange service 102 may facilitate transactions between many different parties, for example, transactions between two or more users (e.g., exchange service members, customers, subscribers, anonymous parties, etc.); between retailers (e.g., iTunes®, Napster®, Walmart®, etc.) and users; between retailers and the custodial service 104 (described below); between users and the custodial service 104; between retailers and the custodial service 104 on behalf of users (with or without the participation of users in the transaction); etc. In transactions between retailers and the custodial service 104 on behalf of users, a user may not be aware that a file is purchased from the retailer on their behalf. In some embodiments, the custodial service 104 may store user financial account information and simply receive authorization to make purchases for the user.

For example, a user who typically listens to music on a Palm® Treo® Smartphone may browse to an interface website 116 maintained by the exchange service 102. The website 116 may list a number of music tracks available for purchase along with current prices for each. Each listing of a particular track may correspond to a specific instance of a copy of the music track stored, for example, with the custodial service 104. The user may select a desired track for purchase, at which point the exchange service 102 may debit the users bank or credit card account and effect a title transfer of the purchased track within the custodial service 104. The actual transfer may involve merely changing data bits representative of ownership, access and/or playback rights (e.g., rights associated with the file that is the purchased music track) to reflect the new ownership of the track by the purchaser and the removal of rights from the seller. In this manner, files may be bought and sold by various parties without making any additional copies of the files and, at the same time, insuring that copyrights of copyright holders of the files being bought and sold are not violated. In a situation in which a file is not already stored within the custodial service 104, media (e.g., a CD or a DVD) containing a legal copy of the file may be physically sent to the custodial service 104 to be added to the custodial service's repository 124 of files as described in detail below. In such embodiments, the exchange service 102 may verify and/or serve to provide verification that only one copy of a given instance of a file copy is permitted to exist. In other words, the exchange service 102 may verify that media containing a copy of a file is destroyed immediately after or while a file is put into the custodial service's repository 124 of files. In some embodiments, the custodial service's repository 124 of files may include the media. Similarly, the exchange service 102 may be integrated with a playback service 106 (described below) to verify and/or serve to provide verification that only one copy of a given instance of a file copy is permitted to exist during playback.

As indicated above, the exchange service 102 may record transaction information associated with a file and store a history of this information. An aggregation of this information may be used to set prices, determine file values, for marketing or advertising purposes, for inventory management purposes, to create or offer upsell opportunities (e.g., additional offers of related products or services), to determine membership levels/status/qualifications, and to conduct audits. This information may also be used to allow the exchange service 102, or an integrated service such as the custodial service 104, to purchase/acquire files for sale to users. The information may be used to determine the demand for a particular file and/or an appropriate price that the exchange service 102 should pay to acquire the file, e.g., for resale. In some embodiments, the exchange service 102 may use the aggregated information to predict future demand for a file and offer purchasers of the file a buy back guarantee or provision. Such a provision would allow the purchaser to sell the file back to the exchange service 102 for a determined price at some future date, for example, after the purchaser has accessed or played the file, if the purchaser is unable to sell the file to a third party, and/or whenever the purchaser wants. The buy back price may be determined at the time of the original sale or at a future date. The buy back price may be a function of the transaction information or other factors. The buy back provision may be optional and election of the provision may effect the original purchase price either positively or negatively. In alternative embodiments, the buy back provision may be mandatory. In some embodiments, the exchange service 102 may be able to aggregate the demand for a particular file in order to purchase multiple copies of the file at a bulk discount rate on behalf of a number of users. Thus, the exchange service 102 facilitates transactions that do not violate copyrights. The exchange service 102 may further provide verification of the non-existence or destruction of file copies; it may integrate with the custodial service 104 for effecting legal transfers while recording all transactions; and it may integrate with the playback service 106 to enable use of transferred files without violating copyrights.

The exchange service 102 may be adapted to support may different types of transactions. In addition to fixed price transactions, the service 102 may provide dynamic pricing based on any number of various factors. For example, prices may be continually adjusted based on a market price determined by the exchange service 102 or determined based on ask/bid information (e.g., similar to the stock market). In some embodiments, transactions involving the purchase or sale of large collections of files (or at least two or more files) from one or more parties to one or more parties may be supported. The pricing may also be dynamic and may include adjustments up or down for, e.g., compete collection premiums and bulk purchase discounts. The exchange service 102 may also support transactions in the form of auction sales, lending, renting, compound/multi-party transactions (e.g., purchase with resale guarantee), repurchase agreements, conditional sales, etc. For example, a sale of a file could be either unconditional or conditional (e.g., a user selling a file may retain an option to later buy the file back). For example, transactions may be supported in which a user who buys a music file from a seller must agree that the seller may buy the music back for, e.g., a future market price, a predetermined portion of the sale price (e.g., seller will give buyer back 90 percent (or 110 percent) of whatever price the buyer paid), or a predetermined price, such as e.g., 10 cents. Such a repurchase right may be constrained to particular times (e.g., after 30 days, after the other person has played it at least 3 times, within one hour) or anytime at the seller's discretion. In some embodiments, the repurchase right provision may be indicated on the interface 118 of the user device 108 for interacting with the exchange service 102, the custodial service 104, and/or the playback service 106, and/or indicated on the interfaces 116, 126, 128 of the exchange service 102, the custodial service 104, and/or the playback service 106 (e.g., a listing that includes a file with a repurchase provision has a certain color that is different than files without such a provision), respectively.

The exchange service 102 of the present invention may be further adapted to support a variety of different revenue models. For example, the exchange service 102 may charge users a fee for each transaction executed for buyers and/or sellers for any of the various different kinds of transaction types. The fee may be fixed or vary based on different factors such as, for example, transaction type, transaction amount/price, user membership level, frequency of prior transactions, commitments to make future transactions, etc. The exchange service 102 may additionally or alternatively generate revenue based on subscription and/or membership fees, upsell offers presented to buyers and/or sellers during and/or after the transactions, through the sale of advertising opportunities to third parties, by providing third parties access to users and/or user information for the purpose, for example, of offering related or unrelated services, products, and/or information, transaction information and marketing data sales, file popularity information sales, etc.

The exchange service 102 of the present invention may be further adapted to support different "right to sell/buy" rules. For example, the right to buy a particular file may be determined based on the first user to bid on the file. This may be referred to as a time based right to buy. Likewise, the service 102 may support a time based right to sell wherein the first to offer a file for sale gets to sell to the first available buyer. Alternatively or secondarily, the right to sell or buy may be based on delivery (e.g., the first seller to have delivered the file to the system or the first buyer to make payment). The exchange service 102 of the present invention may be further adapted to support the sale of different types of financial products (e.g., futures contracts, options contracts, repurchase agreements, other exchange and non-exchange traded derivatives, etc.) based on the files as the underlying commodity. In some embodiments, the exchange service 102 may provide a means to allow a copyright holder to raise funds by selling shares of equity interest in the copyright of a file, for example, in the form of an initial public offering sold through the exchange service 102.

A custodial service 104 or function according to the present invention may also be embodied as a computer server or host executing one or more software applications and/or operating systems (OS). In some embodiments an operator may control aspects of the server's operation and in other embodiments the server may be fully automated. The custodial service 104 may be coupled to and communicate with other devices, servers or services (e.g., an exchange service 102, a playback service 106, user devices 108, 110, 112, a file distribution server, etc.) either directly, for example, via a secure network or indirectly, for example, via intermediary servers or the Internet 114. The custodial service 104 may include a repository 124 that includes electronic data storage arrays such as, for example, networked RAID systems and/or robotic media loaders and readers. In some embodiments, the custodial service 104 may store media (e.g., CDs, DVDs, etc.) with files, such that, for example, the service 104 stores at least one CD for each music album contained in the repository 124. In some embodiments, the custodial service 104 may be embodied as a "back-end" service, that is not accessed or used directly by users and that interacts only with front-end services like, for example, the exchange service 102 and the playback service 106. In some embodiments, however, users may directly access the custodial service 104 or directly receive transmissions from the custodial service 104 via various different user devices 108, 110, 112 including, for example, cellular phones, networked computers, wireless personal digital assistants (PDAs), hand held devices, satellite radio receivers, media players (e.g., Apple®, Inc. iPod®, SanDisk® Sansa®, Toshiba® Gigabeat®, etc.) that may be modified to access a network, WiFi devices including, for example, laptop computers, the Nokia® 770 Internet Tablet®, etc. In some embodiments, the custodial service 104 may include an interface 126 (e.g., user and/or operator interface) embodied as a web page (e.g., an HTML or XML based world wide web (WWW) page) while in others, the user devices 108, 110, 112 may each include an interface 118, 120, 122.

The custodial service 104 may include auditing capabilities that provide tracking information and file verification functions. For example, the custodial service 104 may include means to uniquely identify each instance of a copy of a file (e.g., by assigning or associating a serial/identification number and/or using an electronic "watermark" incorporated into the content of the file) so that at any given moment, all files within the domain of the custodial service 104 can be verified as "legal," non-pirated, copyright compliant copies of the files. Further, the custodial service 104 may store historical information regarding where a particular instance of a file came from, and/or went to, so that a chain of custody may be determined. The custodial service 104 may include programs to compile and/or aggregate the chain of custody information with other transfer information such as, for example, time held by an entity or the number of copies of a particular file are stored in the custodial service's repository 124 to determine marketing or inventory management information. In some embodiments, the custodial service 104 may provide such information, for example, to the exchange service 102.

In operation the custodial service 104 may function as a convenient means to allow users not to have to be concerned with maintaining or storing media containing files. The custodial service 104 may provide secure, reliable, guaranteed storage and management of digital files. Such a service 104 may relieve users of having to have devices with large memory and hard disk capacities as well as relieving users of having to have expensive back-up devices, fragile back-up media, and time consuming back-up procedures. The custodial service 104 may store files in a universally accessible, secure, and guaranteed repository 124. In some embodiments, the custodial service 104 may provide back-up services and file format conversion services. In some embodiments, a custodial service 104 may allow users to access exchange service 102 functions, for example, to transfer ownership of files without having to make copies. Likewise, a custodial service 104 may allow users to access playback service 106 functions, for example, to play or use files without having to make copies.

In some embodiments, the custodial service 104 and/or the repository 124 may be geographically distributed to facilitate playback in multiple geographically diverse locations. The custodial service 104 may provide load balancing among geographically decentralized and redundant servers to help prevent delays in the functioning of the playback service 106. In some embodiments, the custodial service 104 may provide auditing capabilities or service to prove system adherence to copyright laws; allow copyright owners alternative revenue models and marketing opportunities; and to collect marketing information. The custodial service 104 may provide verification of file integrity, authenticity, and originality. For example, the custodial service 104 may compare a newly received copy of a file against a known authentic copy to verify file integrity. The custodial service 104 may provide inventory and file index management for users, the system 100 including system components, and third parties (e.g., retailers, distributors, advertisers, copyright holders, etc.).

In some embodiments, the custodial service 104 may support various membership or use models. For example, users may be required to purchase a subscription for a fee or to make contributions of files to the service (e.g., if a user contributes X number of files, the user may store Y Gb of files). In some embodiments, use of the service 104 may be contingent upon the user acquiring or purchasing an equity ownership share in the service 104. Use of the service 104 may be on a pay-per-use basis. For example, the price per user may be determined based on how much of the user's data or how many of the user's files are stored in the service's repository 124. In some embodiments, use of the service 104 may be contingent upon use of other services. For example, a user may store Y Gb of files, if the user transfers Z number of files via the exchange service 102, or plays back X number of files via the playback service 106.

In some embodiments, the custodial service 104 may be adapted to utilize a user's hard drive (e.g., in a user device 108) for local storage. For example, the custodial service 104 may make part of a user's hard drive a part of a distributed network for storing encrypted files that only the custodial service 104 or the playback service 106 can access directly. In some embodiments, the custodial service 104 may be adapted to collect, log, aggregate, and compute usage information. For example, the custodial service 104 may collect playback, transfer, and store statistics for files within the domain of the custodial service 104 or the domain of other services. For example, the custodial service 104 may have information which it logs that indicate which files were accessed, when, where, and by whom. This data is may be valuable and thus, may be aggregated and sold. In some embodiments, this data may be aggregated in a form similar to Billboard® Magazine's Top Ten Songs. However, instead of being based on the number of plays by radio stations in a week period, a music track's popularity may be much more accurately determined based on the number of user playbacks that occur in a week period). In some embodiments, accesses of files may simply be tracked (e.g., as in a chart of how many times a particular artist's songs were played this year.) In some embodiments, the custodial service 104 may be adapted to purchase or acquire files on behalf of users directly from retailers and/or distributors. For example, the custodial service 104 may download tracks directly from iTunes for a user in response to a user request to the custodial service 104. In another example, a user may initiate a purchase from iTunes and the custodial service 104 may complete the transaction and download the track to the custodial service's repository 124, recording the ownership of the track as that of the purchasing user. In yet another example, a user may authorize iTunes to send a purchased track to the custodial service 104.

As indicated above, the custodial service 104 (or exchange service 102) may act as a market player or market maker. In some embodiments, the custodial service 102 (or exchange service 104) may maintain an inventory of files purchased from members at a discount. The custodial service 104 (or exchange service 102) may effect or even set the market price for files. Using the captured playback, transfer, and storage statistics discussed above, the custodial service 104 (or exchange service 102) may gage demand to predict the prices of files. Using market knowledge, the custodial service 104 (or exchange service 102) may encourage (e.g., provide incentives to) users to acquire files that other users will buy at higher price in the future. In some embodiments, these functions may allow the custodial service 104 to offer tracks (or other files) to users at almost no cost (e.g., just transaction cost).

A playback (or access) service 106 or function according to the present invention may also be embodied as a computer server or host executing one or more software applications and/or operating systems. In some embodiments an operator may control aspects of the server's operation and in other embodiments the server may be fully automated. The playback service 106 may be coupled to and communicate with other devices, servers or services (e.g., an exchange service 102, a custodial service 104, user devices 108, 110, 112, a file distribution server, etc.) either directly, for example, via a secure network or indirectly, for example, via intermediary servers or the Internet 114. The playback service 106 may use a transmission protocol that allows delivery of a file to a user device 108, 110, 112 at a rate such that the user device 108, 110, 112 does not have to buffer, for example, more than a few bytes of the file before the bytes are played on the device and deleted or over written. The user devices 108, 110, 112 may preclude a user from storing a received file, or any part thereof, for any significant or substantial amount of time, for example, less than a second or less than the time required to play the received portion of the file on the device.

Users may access the playback service 106 or receive transmissions from the playback service 106 via various different user devices 108, 110, 112 including, for example, cellular phones, networked computers, wireless personal digital assistants (PDAs), hand held devices, satellite radio receivers, media players (e.g., Apple®, Inc. iPod®, SanDisk® Sansa®, Toshiba® Gigabeat®, etc.) that may be modified to access a network, WiFi devices including, for example, laptop computers, the Nokia® 770 Internet Tablet®, etc. In some embodiments, the playback service 106 may include an interface 128 (e.g., user and/or operator interface) embodied as a web page (e.g., an HTML or XML based world wide web (WWW) page) while in others, the user devices 108, 110, 112 may include an interface 118, 120, 122.

The playback service 106 allows media-free playback on-demand without copyright violation. User device 108, 110, 112 memory requirements are minimal and do not change as a user's library of files grows. The playback service 106 may also provide play list or file index management functions such as sorting playback order, selecting new files to acquire, suggesting old files to resell, file and/or collection market value information, etc. These functions or features may be provided by the service 106 directly (e.g., via the playback service interface 128) and/or may be provided or supported by the user devices 108, 110, 112, as described in more detail below. The playback service 106 provides playback without making copies and with minimal buffering of files as the files are delivered to the user device 108, 110, 112 and immediately played on and removed from the device 108, 110, 112. The playback service 106 may be adapted to "stream" files to only specific user devices 108, 110, 112 such that only devices 108, 110, 112 that can verify that any file received will not be stored by the device. For example, the device 108, 110, 112 may be required to execute a program that searches the device looking for file signatures or identification information to verify that files previously played were not stored. As used herein and unless otherwise indicated, the term streaming may refer to a transfer protocol in which the receiving device verifies to the playback service that received data will not (or cannot) be stored for longer than necessary to play the data on the device and that the transmitted data will be sent a rate slightly higher (e.g., +1% to +5%) than the playback rate. In some embodiments, streaming may implemented using various voice over internet protocols (VOIP). In some embodiments, personal encrypted casting (e.g., V-Cast® as provided by Verizon®) may be employed.

In some embodiments, the playback service 106 may restrict playback to user devices 108, 110, 112 that are registered with the playback service 106 and/or under the control of the playback service 106. For example, the playback service 106 may be able to access the user devices 108, 110, 112 to verify compliance with certain user obligations such as, for example, not storing played back files. In some embodiments, an agent (e.g., an autonomous software module) may be required to run on the user devices 108, 110, 112 to monitor user compliance and operation of the user devices 108, 110, 112. The monitoring agent may report back to the playback service 106 periodically, randomly, and/or before or after each file playback, e.g., using an encrypted message. Playback may be limited by a specific amount of time and/or to a particular number of file accesses/"play backs."

In some embodiments, the playback service 106 may provide facilities to allow different users to share information about their respective play lists with each other. For example, a first user may use the playback service 106 to publicize a list and description (e.g., a voice recording of his comments) of his favorite music tracks. Other users may then use the playback service 106 to find and access the first users' list. The playback service 106 may further facilitate a user acquiring one or more of the first users' music tracks via the exchange service 102 by passing the relevant information to the exchange service 102 automatically to initiate a transaction.

As with the other services 102, 104, the playback service 106 may log, aggregate, and compute usage statistics to set prices, determine file values, for marketing or advertising purposes, for inventory management purposes, to create or offer upsell opportunities (e.g., additional offers of related products or services), to determine membership levels/status/qualifications, and to conduct audits. This information may also be used to allow the playback service 106, or an integrated service such as the exchange service 102 and/or custodial service 104, to purchase/acquire files for sale to users. The information may be used to determine the demand for a particular file and/or an appropriate price that the exchange service 102 should pay to acquire the file, e.g., for resale. In some embodiments, the aggregated information may be used to predict future demand for a file and offer purchasers of the file a buy back guarantee or provision.

In some embodiments, the playback service 106 may insure that the system 100 remains in compliance with copyright laws and/or file license provisions by locking instances of a file so that the file may not be accessed. For example, if the system 100 (or its users) holds X number of licenses to playback a particular music track, the playback service 106 may restrict concurrent playback to X or fewer instances of playback at any given time. Such a restriction may be enforced by the playback service 106 even if, for example, one more users may have multiple user devices 108, 110, 112 that would otherwise be permitted to concurrently playback a given music track.

In some embodiments, the playback service 106 may employ time slicing to insure that the system 100 remains in compliance with copyright laws and/or file license provisions. Time slicing of a file allows concurrent access of a file but of only different portions of the file. For example, in some embodiments, even if only one license to a file is held by the system 100, two or more different users may still concurrently access or playback different portions of the file without making copies of the file and without violating copyright laws and/or file license provisions. The playback service 106 may insure that at any given time the two or more users playback or access different portions of the file so that at any given time there is never more than one instance of any portion of the file. Note that as used herein, the term concurrent may mean two or more copies of a file being played at the same time but not necessarily synchronized (e.g., one playback started later than another) and the term "same portions being played simultaneously" may mean playback is synchronized (e.g., both playbacks are started at the same time). Using these terms, the playback service 106 may allow concurrent playback of a file without the same portions of the file being played simultaneously. More generally, the present invention may allow concurrent access of a file without the same portions of the file being accessed simultaneously.

The present invention may be embodied as an Internet portal in which, for example, integrated embodiments of an exchange service 102, a custodial service 104, and a playback service 106 may be accessible along with related products and services of numerous retailers, distributors, copyright holders, and third parties. The integration may be such that a user does not perceive the separate operation of the different services 102, 104, 106. In some embodiments, the services 102, 104, 106 may in fact all be implemented as a single service, two services, or four or more services instead of the three specific services described above.

In some embodiments, the present invention may be implemented as an online library. Users may access an Internet portal (as described above) that offers to loan files to users without making copies of the files. The online library may charge a membership fee and/or require contributions to the library's collection of files. In some embodiments, the online library may be implemented as merely an alternative interface or overlay on the commercial Internet portal described above. In some embodiments, a user may "check out" a file for a period of time (or for a number of playbacks) in which the user may have exclusive use of the file.

In some embodiments, the present invention may be implemented as a collection of files owned by an entity such as a corporation or partnership. Members or owners of the entity may be required to hold an equity stake in the entity in order to be permitted to access the entity's files. In some embodiments, contribution of files and/or capital may entitle an individual to become an equity holder. The files owned by the entity may be held as a joint asset of the equity holders and the equity holders may be permitted to access the files in the same manner as described above with respect to the online library via an Internet portal (also as described above). Equity in the entity may be sold to the public via, for example, an initial public offering (IPO). An IPO may be used to raise funds to acquire files for the entity or to compensate equity holders for their contributions to the entity. In some embodiments, the entity may acquire copyrights in files. In some embodiments, copyright owners may contribute copyrights to the entity in exchange for equity in the entity.

The user devices 108, 110, 112 may include new types of devices as well as versions of commercially available devices that have been modified to include features specifically to enable implementation of the present invention. For example, a version of the Apple®, Inc. iPod® could be created with a wireless communications capability and limited (or no) memory for file storage. Such a device could be adapted to receive and playback files without storing the files. Instead of indicating files stored on the device, the iPod file management interface may be adapted to remotely manipulate and access files associated with the user in the custodial service 104, or available for access via the playback service 106, or available for purchase via the exchange service 102. In some embodiments, user devices 108, 110, 112 may include additional hardware features to facilitate other aspects of the present invention. For example, a device 108 may include a buy/sell button which allows a user to indicate to the exchange service 102 that a file highlighted on the device interface 118 is to be sold if the user owns the file or purchased if the user does not own the file. A device 108 may include a preview button that allows a user to access a limited portion of a file as a preview. In some embodiments, for example, a device 108 may include trading buttons to help expedite transactions, "VCR" control buttons, dials, slides, shuttles, sticks, and/or track pads to make playback, searching, and/or selecting easier, and/or game controls to facilitate interaction with the services 102, 104, 106 and/or files. Other hardware features such as display screens and vibration/audible alarms may also be included.

In some embodiments, the device 108 may have a limited reception range. For example, the device may provide 802.11g LAN connectivity to the Internet 114, WiFi Internet 114 access, and/or a RF based communications protocol to access the Internet 114. The reception may be restricted based on transmission time and/or distance to an Internet access point or a host (e.g., a user's desktop PC). In some embodiments, the host may be on a network serving as a controlled link to connect to the services 102, 104, 106. In some embodiments, part of the host (e.g., part of a user's hard drive) may be used as local (distributed) storage for files, e.g., under the exclusive control of the custodial service 104. In some embodiments, the system 100 may operate using encrypted files that may be stored on a user's personal computer and playback may be enabled exclusively via a user device associated or registered with the system 100. For example, a wireless device such as the wireless/memory-less modified iPod described above, an FM receiver, cell phone, or other device may be adapted to only playback a signal received from a particular personal computer. Likewise, the personal computer may be adapted to only transmit to the particular user device. In some embodiments, the wireless/memory-less modified iPod described above may be embodied as a phone with VOIP capabilities. In addition, such a phone may receive VOIP signals via a wireless protocol such as, for example, via the WiFi protocol.

In some embodiments, the user device 108 may be installed in a vehicle (e.g., embodied as a WAN/Satellite signal receiver). Such a device may receive or download files (e.g., without copying as described above or with a playback restriction such as, e.g., a limited number of play backs) when the vehicle is within transmission range (e.g., transmission range of a wireless LAN, 802 protocols, WiFi, Bluetooth®, etc.) of a user PC or from the user PC via, for example, a cell phone, an RF signal, and/or radiotelephone, etc. The device may be permanently installed in the vehicle or it may include a removable head unit that may connect to other playback equipment or the PC.

In some embodiments, the user device 108 may be implemented as a conventional cell phone or wireless PDA adapted to receive a call in which the file is played back to the user. To improve sound quality and insure the file is not copied, digital protocols such as VOIP may be employed. In some embodiments, multi-channel (e.g., stereo) information may be encoded in the digital signal and the phone may be adapted to decode the multi-channel information as it is received to create, for example, stereo sound. The phone may be further adapted to play back multi-channel sound, for example, through the use of connected stereo headphones or a multi-channel amplifier and speaker system. A desktop or automobile mounted cradle may be used to facilitate connection of the phone or PDA to stereo headphones or a multi-channel amplifier and speaker system.

In some embodiments, the services 102, 104, 106 and the user devices 108, 110, 112 may include interfaces 116, 126, 128, 118, 120, 122, respectively. As discussed above, the user device interfaces 118, 120, 122 may include any number of hardware interface features to facilitate operation of and interaction with the devices 108, 110, 112. Likewise, the services' interfaces 116, 126, 128 include any number of hardware interface features to facilitate operation of and interaction with the services 102, 104, 106. Further, both the services' interfaces 116, 126, 128 and the user device interfaces 118, 120, 122 may include software-based interface features to facilitate operation of and interaction with the services 102, 104, 106 and the user devices 108, 110, 112. For example, a users play list can be integrated or linked with the exchange service 102 (e.g., to make purchasing suggestions, marketing offers, and/or to show a current value of each of the user's files). The listing of files for sale in the exchange service 102 can indicate the types of transactions or transfers available for each file.

The interfaces 116, 126, 128, 118, 120, 122 may include software interface features that provide access to a recommendation system in which information about files and/or actual file samples may be shared with other users or with a "buddy" list of users. The device may include a graphical user interface that supports playback of, and access to, all file types (e.g., video, music, applications, games, ASP, databases, etc.). The software interface may support security features such as a login protocol, and automation features such as automated login or a "no-click" file purchase method. For example, the example wireless iPod described above (or any other media player hardware/software device) may be configured to automatically login to the custodial service 104, provide the required authentication information (e.g., username and password), and obtain a list of the user's music tracks. In some embodiments, a part of the required login could be machine-entered information like the media access control (MAC) identifier of the example wireless iPod and/or some of its components. In other words, some information would not have to be entered by the user, but the device may be adapted to nevertheless transmit the information so that the information may be used for login/security/authentication purposes. In some embodiments, the software interface may be configurable to allow default login information to be changed as well as allow a user to activate or deactivate, for example, an auto login feature.

The interfaces 116, 126, 128, 118, 120, 122 may also include software interface features that support the repurchasing of previously owned files. For example, a user's "play list" or list of files may include an indication of files that were previously owned but then sold (e.g., a song name is visible on a play list but is grayed out or otherwise has a different appearance). If that file or equivalent (i.e., same music track but a different user's copy of it) is currently available for sale, then such information may be indicated (e.g., a star next to the listing, a "buy-now" icon). The interfaces 116, 126, 128, 118, 120, 122 may further include software interface features to aid in the purchasing of music. In some embodiments, the exchange service interface 116 may include transaction features such as file selection controls, payment controls, terms selection controls, etc. The exchange service interface 116 may further include a graphical user interface (GUI) control adapted to allow users to direct the custodial service 104 to purchase files on behalf of the users or other members or customers.

In some embodiments, the exchange service 102 may buy financial products from, and/or sell financial products to, users. For example, the exchange service 102 may sell repurchase agreements for files and/or file futures contracts. A repurchase agreement for a file from an owner of the file includes both a first agreement to provide funds in exchange for the file and a second agreement to repurchase the file. A file futures contract is a contract that may be traded via the exchange service 102 to buy or sell a file at a certain date in the future, at a pre-set price. For example, the exchange service 102 may allow a user to purchase a contract that specifies that the exchange service 102 will sell the user a particular music track for $1 in one year. If the value of the music track is more than $1 plus the price of the contract, the user reaps the benefit.

In some embodiments, the exchange service 102 may generate market data feeds. Similar to a Reuters® or Bloomberg® data feed, the price of various files may be continuously reported in a data feed format. The interfaces 116, 126, 128, 118, 120, 122 may display the feed or information contained in the feed to users and/or operators of the system 100. In some embodiments, information from the exchange service 102 (e.g., a market data feed) may be used to provide a user with file collection pricing or value information. For example, a user's entire collection of music may be priced or valued based on, e.g., the sum of the current market value of each music track the user owns.

In some embodiments, the system 100 may employ a file transfer or communications protocol that is specifically adapted to ensure that files transmitted using the protocol are not stored or copied. More specifically, the system 100 of the present invention may use a protocol (e.g., implemented in network adapters and/or operating systems of the system's various components) that assures that only a preset maximum number of bytes, or portion of a file, may be permitted to be received, processed, and deleted (or overwritten) before subsequent bytes of the file are permitted to be transmitted and/or received. For example, the protocol may assure that a music file transmitted to a user device is processed (e.g., played on the device) and deleted as the file is being received by the device. Such a protocol may be used to guarantee that only a limited portion of the file is temporarily buffered and only for as long as is required to process the file. The protocol may further insure that processing the file does not include transferring the file to memory, a storage device, or other devices that could potentially capture the file. For example, the protocol may require that the file may only be transferred to known/registered output devices (e.g., a particular digital to analog converter/amplifier combination) in user devices 108, 110, 112 that are incapable of storing the file. The protocol may be implemented such that an indicator bit, tag, token, or code word (e.g., included in a file being transferred) conveys to protocol compliant hardware and software that the file is copyrighted and is to only be transferred with minimal buffering and without being stored or copied in transit or at the destination. In some embodiments, the protocol compliant hardware and software may be adapted to recognize copyrighted files themselves, for example, via a database of file "signatures."

The present invention includes many different methods as indicated above in the description of the apparatus of the invention. However, two exemplary methods are depicted in the flow charts of FIGS. 2 and 3 to further illustrate aspects of the invention. Although a specific sequence of a specific number of steps are identified, it will be understood that the invention may be embodied using fewer steps or any number of additional steps or sub-steps executed in any practicable order.

Figure 2:
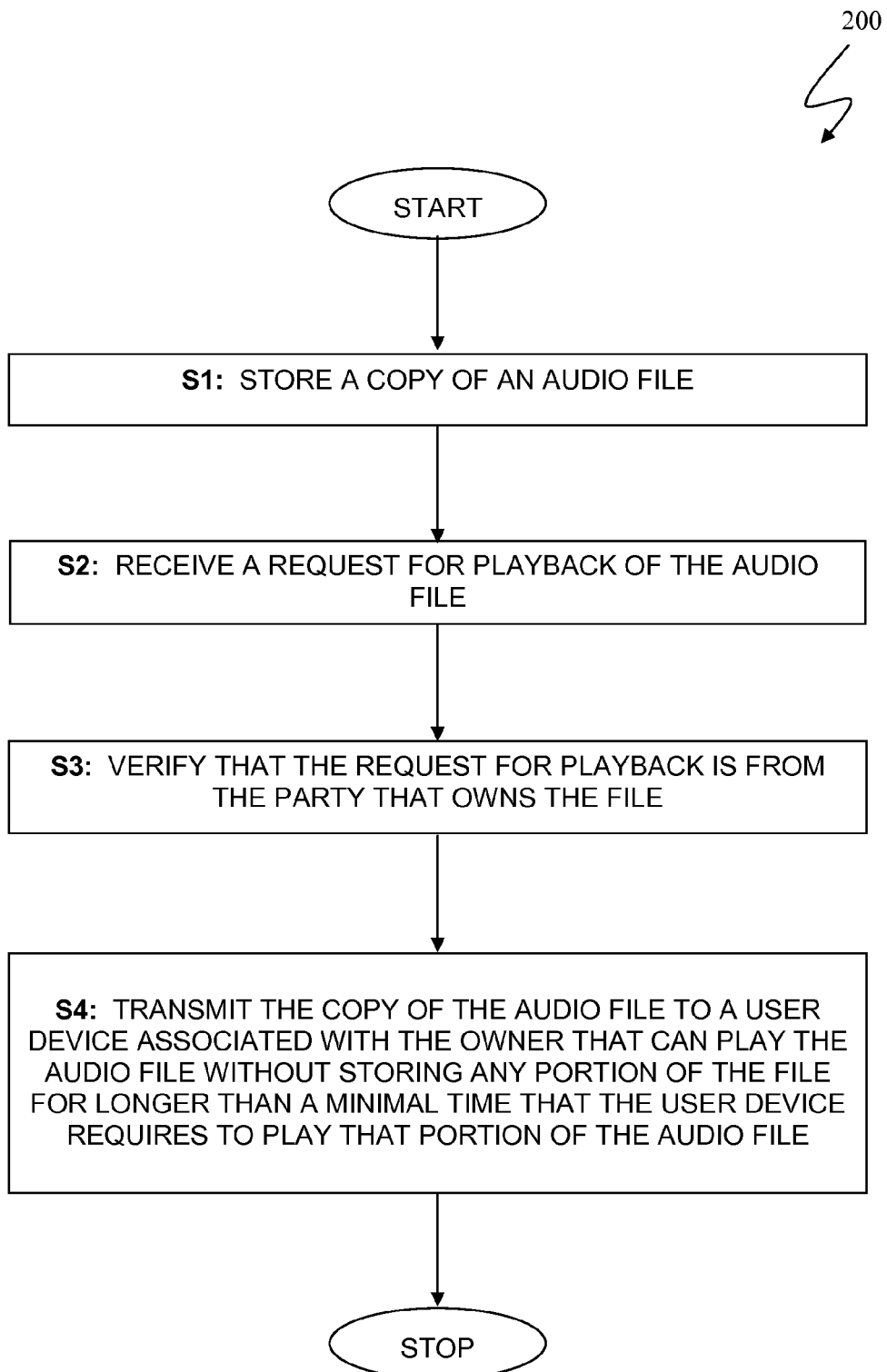
FIG. 2 is a flowchart depicting an example embodiment of a first exemplary method according to some embodiments of the present invention.

Turning to FIG. 2, the first exemplary method 200 begins at Step S1 wherein a copy of an audio file is stored by the custodial service 104. The copy of the audio file is owned by a party who does not have custody of the audio file. In Step S2, a request for playback of the audio file is received by the playback service 106. In Step S3, the request for playback is verified to be from the party that owns the file. In some embodiments, the playback service 106 may provide the custodial service 104 with an identifying password provided to the playback service 106 automatically by a user device 108. The custodial service 104 may use the password to verify the stored audio file is associated with the device 108 or user. For example, the stored audio file may include a copy of the password and a match between the provided password and the stored password may indicate to the system 100 that the user of the device 108 is in fact the owner of the stored audio file. In Step S4, a signal representative of the copy of the audio file is transmitted to the user device 108 associated with the owner of the audio file copy. The user device is operative to receive the signal and play the audio file without storing any portion of the audio file for longer than a minimal time that the user device requires to play the received portion of the audio file.

Figure 3:
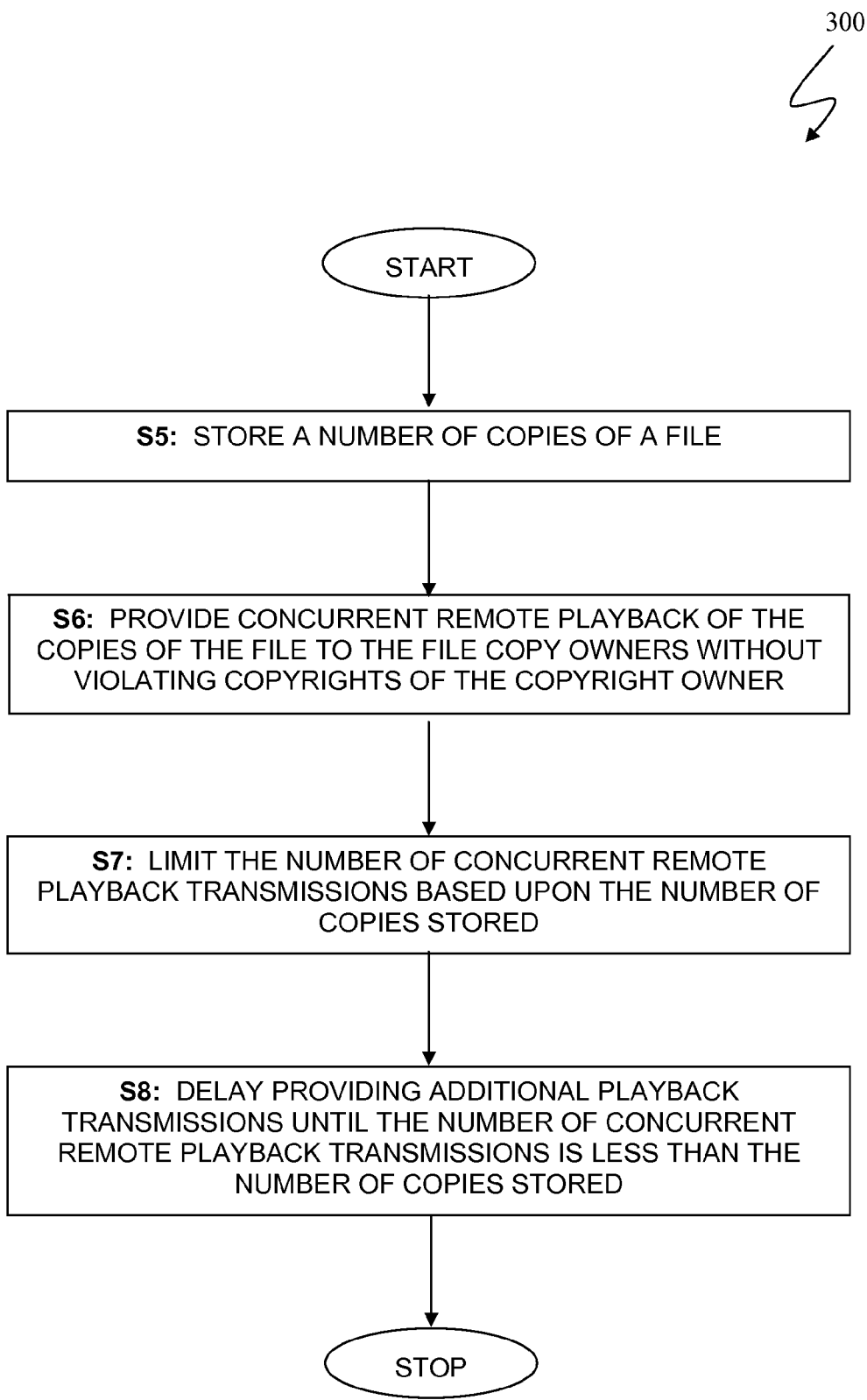
FIG. 3 is a flowchart depicting an example embodiment of a second exemplary method according to some embodiments of the present invention.

Turning to FIG. 3, the second exemplary method 300 begins at Step S5 wherein a number of copies of a file are stored by the custodial service 104. Each copy may be associated with a different party. Each party has an ownership right in at least one of the stored copies of the file. In Step S6, the playback service 106 provides concurrent remote playback of the copies of the files to the parties without violating copyrights of copyright owners of the files. In Step S7, the playback service 106 limits the number of concurrent remote playback transmissions based upon the number of copies stored. In Step S8, playback to a party requesting playback is delayed until the number of concurrent remote playback transmissions is less than the number of copies stored. For example, as remote playback transmissions complete, the number of concurrent remote playback transmissions decreases and the system 100 allows a new playback transmission to commence in response to the party requesting the new playback transmission of the file.

The foregoing description discloses only particular embodiments of the invention; modifications of the above disclosed methods and apparatus which fall within the scope of the invention will be readily apparent to those of ordinary skill in the art. Accordingly, while the present invention has been disclosed in connection with specific embodiments thereof, it should be understood that other embodiments may fall within the spirit and scope of the invention, as defined by the following claims.

The invention claimed is:

1. A method comprising:
receiving, by a service, a plurality of audio files from a user;
in response to receiving the plurality of audio files, making the plurality of audio files available to playback from the service;
transmitting, from a handheld device through a wireless communication network, first identifying information of the user to the service for authentication;
after making the plurality of audio files available to playback, authenticating, by the service, the first identifying information of the user received from the handheld device through a wireless communication network;
in response to authenticating the first identifying information, sending, to the handheld device from the service through the wireless communication network, a play list of the user, in which the play list identifies the plurality of audio files;
receiving, by the handheld device through the wireless communication network, the play list of the user, in which the play list identifies the plurality of audio files;
transmitting, from the handheld device through the wireless communication network, a first request to playback an audio file of the plurality of audio files;
receiving, from the handheld device by the service through the wireless communication network, the first request to playback an audio file of the plurality of audio files;
in response to receiving the first request, sending, to the handheld device by the service through the wireless communication network, at least a portion of the audio file;
receiving, by the handheld device through the wireless communication network, at least a portion of the audio file;
playing, by the handheld device, the portion of the audio file to the user;
transmitting, from a computing device that is different from the handheld device, identifying information of the user to the service for authentication;
authenticating, by the service, second identifying information of the user received from the computing device;
in response to authenticating the second identifying information, sending, to the computing device the play list of the user, in which the play list identifies the plurality of audio files;
receiving, by the computing device, the play list of the user, in which the play list identifies the plurality of audio files;
receiving, from the computing device, a second request to playback the audio file of the plurality of audio files;
in response to receiving the second request, sending, to the computing device, at least the portion of the audio file;
receiving, by the computing device, at least a portion of the audio file; and
playing, by the computing device, the portion of the audio file to the user.

2. The method of claim 1, comprising:
in response to playing the portion by the handheld device, determining, by the handheld device, that the portion is not stored in a memory of the handheld device.

3. The method of claim 1, comprising:
determine, by the service, that the plurality of audio files do not exceed a storage capacity associated with an account of the user.

4. The method of claim 1, comprising:
determining, by the service, that the handheld device is executing an approved software application, in which determining that the handheld device is executing the approved software includes determining that the handheld device is configured to delete the portion of the audio file in response to playing the portion of the audio file to the user.

5. The method of claim 1, comprising:
determining, by the service, a number of current simultaneous playbacks of the audio file, and preventing a playback of the audio file based on the number of current simultaneous playbacks.

6. The method of claim 1, comprising:
determining, by the service, that the user has legal rights to listen to the audio file on the handheld device based on an internal component of the audio file before sending the portion of the audio file to the handheld device.

7. The method of claim 6, in which determining that the user has legal rights includes analyzing a digital watermark of the audio file.

8. The method of claim 1, comprising:
determining, by the handheld device, that the portion is not stored on the handheld device in response to playing the portion to the user.

9. The method of claim 1, comprising:
transmitting a message to the service from the handheld device indicating that the handheld device has searched a memory of the handheld device to determine that the audio file is not stored in the memory.

10. The method of claim 1, comprising:
determining, by the service, playback of a song by a plurality of users including the user by aggregating playback of the audio file with playback of other audio files stored by the apparatus.

11. The method of claim 10, in which determining playback includes determining a popularity of a song over a period of time.

12. An apparatus, comprising:
a non-transitory machine readable medium having stored thereon a plurality of instructions that are configured such that when a computing system executes the instructions, the computing system is caused to:
receive a plurality of audio files from a user;
determine that the plurality of audio files do not exceed a storage capacity associated with an account of the user;
in response to receiving the plurality of audio files, make the plurality of audio files available to playback from the apparatus;
after making the plurality of audio files available to playback, authenticate first login information of the user received from a handheld device through a wireless communication network;
in response to authenticating the first login information, send, to the handheld device through the wireless communication network, a play list of the user, in which the play list identifies the plurality of audio files;

receive, from the handheld device through the wireless communication network, first a request to playback an audio file of the plurality of audio files;

in response to receiving the first request, send, to the handheld device through the wireless communication network, at least a portion of the audio file;

authenticate second login information of the user received from a computing device that is different from the handheld device;

in response to authenticating the second login information, send, to the computing device the play list of the user, in which the play list identifies the plurality of audio files;

receive, from the computing device through the wireless communication network, a second request to playback the audio file of the plurality of audio files; and in response to receiving the second request, send, to the computing device, at least the portion of the audio file.

13. The apparatus of claim 12, in which the handheld device includes a cellular telephone.

14. The apparatus of claim 12, in which the computing device includes a laptop computer.

15. The apparatus of claim 12, in which the plurality of instructions are configured such that when the computing system executes the instructions, the computing system is caused to:

adjust a sending of the portion of the audio file to the handheld device.

16. The apparatus of claim 12, in which the plurality of instructions are configured such that when the computing system executes the instructions, the computing system is caused to:

determine that the handheld device is executing an approved software application.

17. The apparatus of claim 16, in which determining that the handheld device is executing the approved software includes determining that the handheld device is configured to delete the portion of the audio file in response to playing the portion of the audio file to the user.

18. A method comprising:

transmitting a respective indication of each of a plurality of audio files from a handheld device through a wireless communication network to a service;

transmitting, from a handheld device through a wireless communication network, identifying information of a user to a service for authentication;

receiving, by the handheld device through the wireless communication network, a play list of the user, in which the play list identifies the plurality of audio files;

transmitting, from the handheld device through the wireless communication network, a request to playback an audio file of the plurality of audio files;

receiving, by the handheld device through the wireless communication network, at least a portion of the audio file;

playing, by the handheld device, the portion of the audio file to the user; and in response to playing the portion, determining that the portion is not stored in a memory of the handheld device.

19. An apparatus comprising:

a non-transitory machine readable medium having stored thereon a plurality of instructions that are configured such that when a computing system executes the instructions, the computing system is caused to:

transmit a respective indication of each of a plurality of audio files from a handheld device through a wireless communication network to a service;

transmit, from a handheld device through a wireless communication network, identifying information of a user to a service for authentication;

receive, by the handheld device through the wireless communication network, a play list of the user, in which the play list identifies the plurality of audio files;

transmit, from the handheld device through the wireless communication network, a request to playback an audio file of the plurality of audio files;

receive, by the handheld device through the wireless communication network, at least a portion of the audio file;

play, by the handheld device, the portion of the audio file to the user; and in response to playing the portion, determine that the portion is not stored in a memory of the handheld device.

20. The apparatus of claim 19, in which the instructions, when executed, further causes the apparatus to:

verify that the request to playback the audio file is from the user.

21. The apparatus of claim 19, in which receiving the at least a portion of the audio file comprises:

receiving the at least a portion of the audio file according to a protocol; and in which the protocol permits only a preset maximum number of bytes of the audio file to be received by the playback device before subsequent bytes of the audio file are permitted to be received by the playback device.

22. The apparatus of claim 19, in which receiving the at least a portion of the audio file comprises:

receiving the at least a portion of the audio file streamed at a rate.

23. The apparatus of claim 19, in which the instructions, when executed, further causes the apparatus to:

transmit a unique identifier of the playback device as authentication information of the user.

24. The apparatus of claim 19, in which the instructions, when executed, further causes the apparatus to:

transmit a fee accompanying the request to playback the audio file.

25. The apparatus of claim 19, in which determining that the audio file is not stored on the playback device comprises:

subsequent to receiving the at least a portion of the audio file, transmitting a report that the audio file is not stored on the playback device.

26. The apparatus of claim 19, in which receiving the report comprises:

transmitting a message that the audio file is not stored on the playback device, in which the message comprises an encrypted message.

27. The apparatus of claim 19, in which the user has an ownership right in the audio file.

* * * * *